United States Patent [19]

Yamamoto et al.

[11] Patent Number: 4,903,057

[45] Date of Patent: Feb. 20, 1990

[54] APPARATUS FOR PRODUCING PHOTOGRAPH

[75] Inventors: Shohei Yamamoto; Hiroyuki Aki; Hiroshi Katsu; Yuichi Teshigawara; Kenichi Atsumi, all of Tokyo, Japan

[73] Assignee: Fuji Photo Film Co., Ltd., Kanagawa, Japan

[21] Appl. No.: 302,652

[22] Filed: Jan. 27, 1989

[30] Foreign Application Priority Data

Jan. 29, 1988 [JP] Japan .................................. 63/19303

[51] Int. Cl.⁴ .............................................. G03B 17/50
[52] U.S. Cl. ...................................... 354/88; 354/290; 355/27
[58] Field of Search ....................... 354/83, 75, 76, 290, 354/301, 84, 85, 86, 88; 355/27; 250/316.1, 317.1, 318, 319

[56] References Cited

U.S. PATENT DOCUMENTS

| | | | |
|---|---|---|---|
| 3,818,497 | 6/1974 | Chiesa | 354/83 |
| 4,021,110 | 5/1977 | Pundsack | 355/27 |
| 4,430,415 | 2/1984 | Aono et al. | 430/203 |
| 4,483,914 | 11/1984 | Naito et al. | 430/203 |
| 4,500,626 | 2/1985 | Naito et al. | 430/203 |
| 4,503,137 | 3/1985 | Sawada | 430/203 |
| 4,800,275 | 1/1989 | Shimizu et al. | 355/27 |

FOREIGN PATENT DOCUMENTS

| | | |
|---|---|---|
| 59-154445 | 9/1984 | Japan . |
| 59-165054 | 9/1984 | Japan . |
| 59-180548 | 10/1984 | Japan . |
| 59-218443 | 12/1984 | Japan . |
| 60-120356 | 6/1985 | Japan . |
| 61-88256 | 5/1986 | Japan . |
| 138934 | 6/1986 | Japan .................................. 354/83 |
| 61-238056 | 10/1986 | Japan . |

Primary Examiner—L. T. Hix
Assistant Examiner—Brian W. Brown
Attorney, Agent, or Firm—Sughrue, Mion, Zinn, Macpeak, Seas

[57] ABSTRACT

A photograph-producing apparatus used for rapidly obtaining a portrait photograph of a person for such purposes as pasting on a certification. When a heat development photosensitive material is sent from a receiving portion to a photographic exposure portion in which an image is exposed thereon, frame exposure is performed around the image to form a white portion around the image serving as a final product. After the image has been exposed on the photosensitive material, a solvent for forming the image is applied to the photosensitive material and then adhered to an image-receiving material so that an image or picture is transferred to the image-receiving material which then serves as the product.

20 Claims, 20 Drawing Sheets

F I G. 6
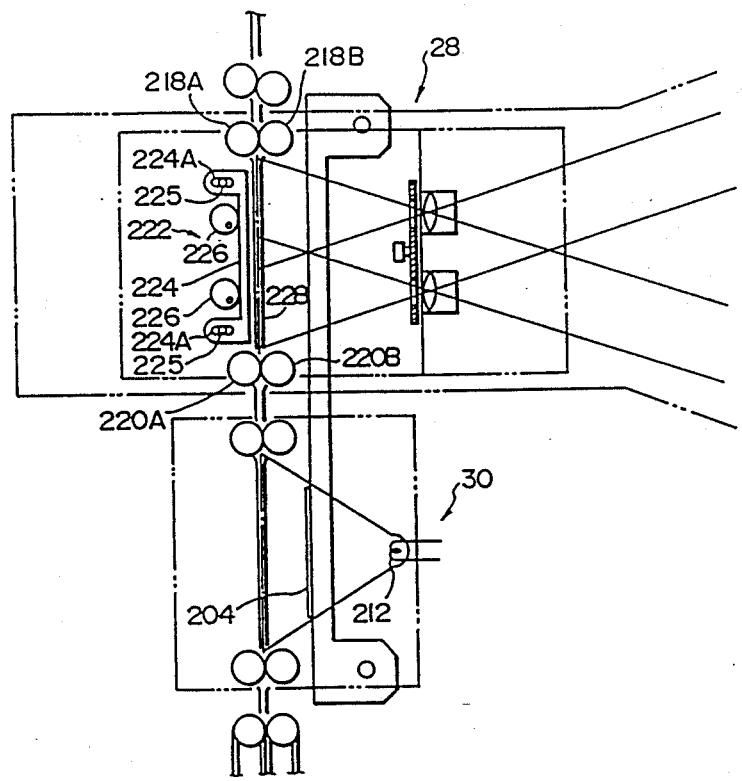

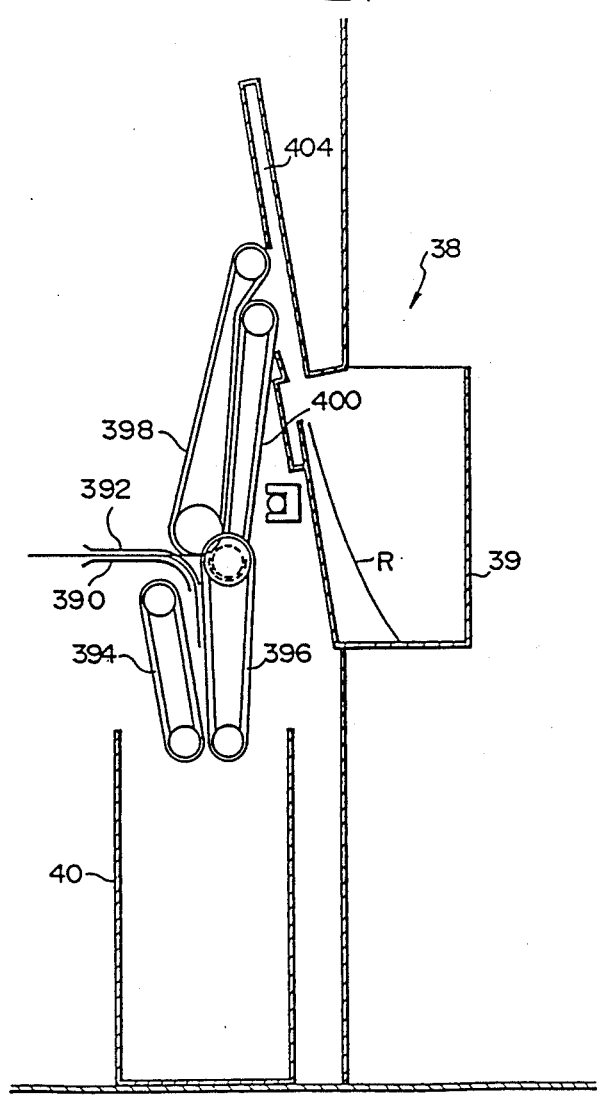

APPARATUS FOR PRODUCING PHOTOGRAPH

BACKGROUND OF THE INVENTION

The present invention relates to an apparatus for producing photographs suited for applications where the photographed image of a person is handled rapidly in order to provide a portrait photograph for such purposes as obtaining a certification.

A conventional photographic apparatus for providing portrait photographs such as those pasted, for example, to licenses or official certificates comprises a photographic chamber and a chamber for producing a photograph provided in a single housing. A person to be photographed takes a seat in the photographic chamber while their portrait picture is taken and then developed in the photograph production chamber.

Such conventional photographic apparatuses are arranged so that a photographic image is formed on a negative film and then subjected to development after being printed on a photographic printing paper. Alternatively, the negative is subjected to photographic exposure on a special photographic printing paper to form a positive image which is then developed. Such apparatus therefore require a relatively long time in providing a photograph as a final product. Photographic apparatus employing a diffusion transfer process enable images formed on photosensitive materials by photographic exposure to be transferred to image receiving materials immediately after being developed, thereby producing photographs very rapidly.

SUMMARY OF THE INVENTION

In consideration of the above-described facts, it is an object of the present invention to provide an apparatus for producing photographs in a very short time.

The present invention is characterized by comprising a heat development photosensitive material receiving portion; a photographic exposure portion for performing photographic exposure of the image of a person on the photosensitive material which is sent from the receiving portion; a frame exposure portion for exposing the margin of the photographic image formed on the photosensitive material; an application portion for applying a solvent used to form the image on the photosensitive material after frame exposure; an image receiving material-receiving portion; a heat development transfer portion for causing the photosensitive material, to which the solvent, used in forming the image, has been applied, to adhere to the image receiving material sent from the image receiving material-receiving portion and for heat-developing the photosensitive material, as well as transferring the developed image to the receiving material; and a separation means for separating the photosensitive material from the image receiving material.

In the present invention, the image of a person is exposed on the heat development photosensitive material, subjected to frame exposure, developed, and then transferred to the image receiving material after the solvent, used ,or forming the image has been applied to the heat development photosensitive material. The image receiving material is thereby supplied as a final product. It is therefore possible to obtain a photograph as a final product in a very short time. In addition, frame exposure, which is performed around the margin of the photographic image of the product, enables the margin of the personal image to appear as a white frame, thereby improving the product's value.

The present invention may have a heat development portion for heat-developing the exposed photosensitive material, and a transfer portion for heating the photosensitive material after heat development and the image receiving material which are placed one on the other so as to transfer the image to the image receiving material. These portions are separately provided. Alternatively, the present invention may have a heat development portion and a transfer portion provided in the same portion, i.e., the present invention may have a heat development portion which is capable not only of heating the exposed heat development photosensitive material and the image receiving material placed thereon, but also simultaneously effecting transfer, heat development and heat transfer as is described below in relation to an embodiment of the present invention.

The present invention is also capable of utilizing heat development photosensitive materials (heat development photosensitive elements) and image receiving materials (dye fixing elements) of the types described in, for example, U.S. Pat. Nos. 4,430,415, 4,483,914, 4,500,626 and 4,053,137, Japanese Patent Laid-Open Nos. 154445/1984, 165054/1984, 0548/1984, 218443/1984 and 120356/1985, U.S. patent application Nos. 209563/1984, 79709/1985, 169585/1985 and 244873/1985.

The solvent used in the present invention for forming images is a solvent, ,or example water a low-boiling point organic solvent (alcohol, ketones, amides and the like), or a solvent containing various additives such as a surfactant, a development accelerator, a development inhibiting agent and so forth.

BRIEF DESCRIPTION OF THE DRAWINGS

FIG. 6 is a vertical sectional view of a photographic exposure portion and a frame exposure portion;

FIG. 21 is a vertical sectional view of a separation portion; and

DETAILED DESCRIPTION OF PREFERRED EMBODIMENTS

Figure 1:
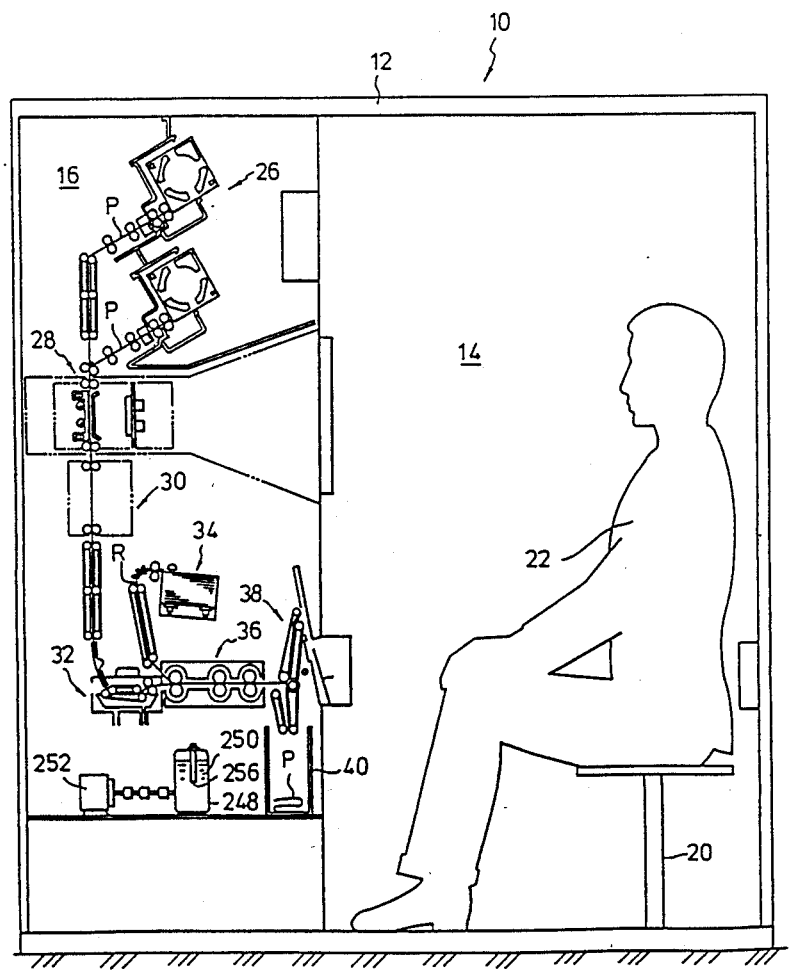
FIG. 1 is a sectional side view of an apparatus for producing photographs to which the present invention is applied.
Figure 2:
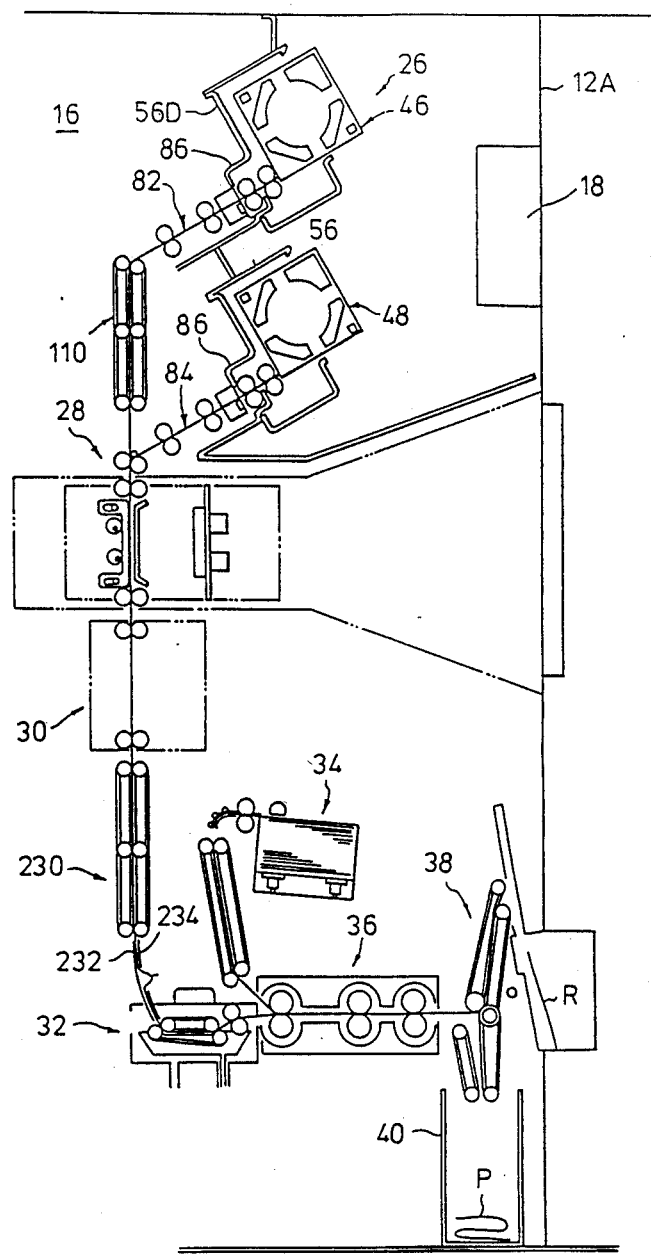
FIG. 2 is an enlarged view of a portion of FIG. 1.

FIGS. 1 and 2 show an apparatus 10 for producing photographs to which the present invention is applied.

The apparatus 10 for producing photographs has a housing 12 comprising a photographic chamber 14 on one side and a photograph producing chamber 16 on the other side. A seat 20 is provided in the photographic chamber 14 on which a person 22 to be photographed can sit.

On the other hand, a photosensitive material receiving portion 26 which receives a heat development photosensitive material P is provided in the chamber 16 for producing photographs, the photosensitive material P being supplied to a photographic exposure portion 28 from the photosensitive material receiving portion 26, and the image of the person 22 is exposed thereon. After photographic exposure has been performed, the photosensitive material P is sent to a frame exposure portion 30 where the material P is subjected to frame exposure, next to a water application portion 32, and then to a heat development portion 36 together with an image receiving material R which is sent out from the an image receiving material-receiving portion 34, the two materials being adhered to each other. In the heat development portion 36, the photosensitive material P and the image receiving material R are adhered to each other and heated in order to carry out the heat development of the photosensitive material P, as well as transferring the developed image to the image receiving material R. After heat development and transfer have been performed, the photosensitive material P and the image receiving material R are separated from each other in a separation portion 38, the image receiving material R being supplied as a final product to a takeoff box 39, while the photosensitive material P is sent to a photosensitive material waste box 40 for later disposal.

Detail description will now be given of each of the component portions.

(Photosensitive Material Receiving Portion)

Figure 3:
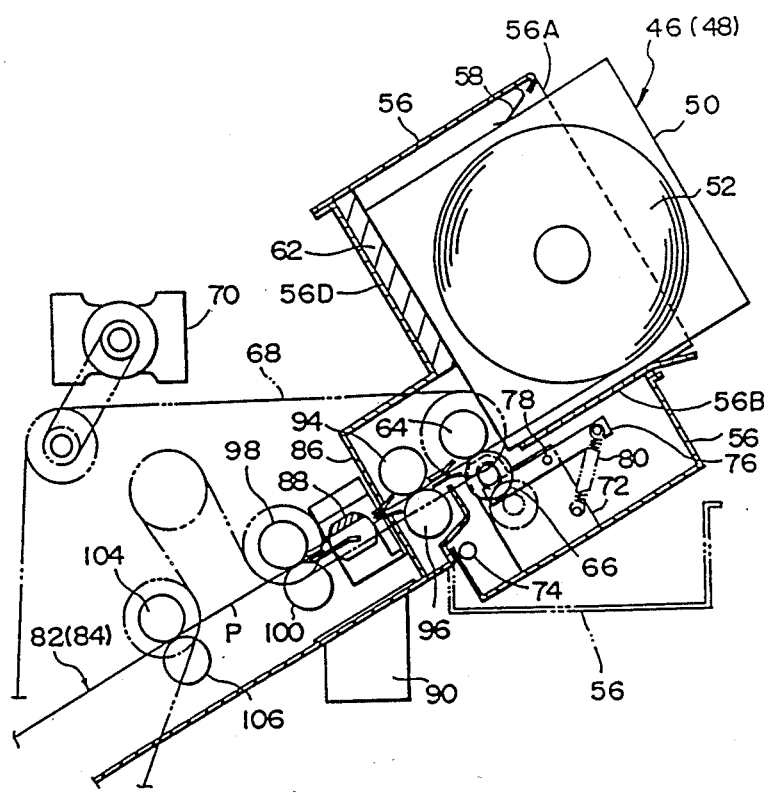
FIG. 3 is a longitudinal sectional view of a photosensitive material receiving portion.
Figure 4:
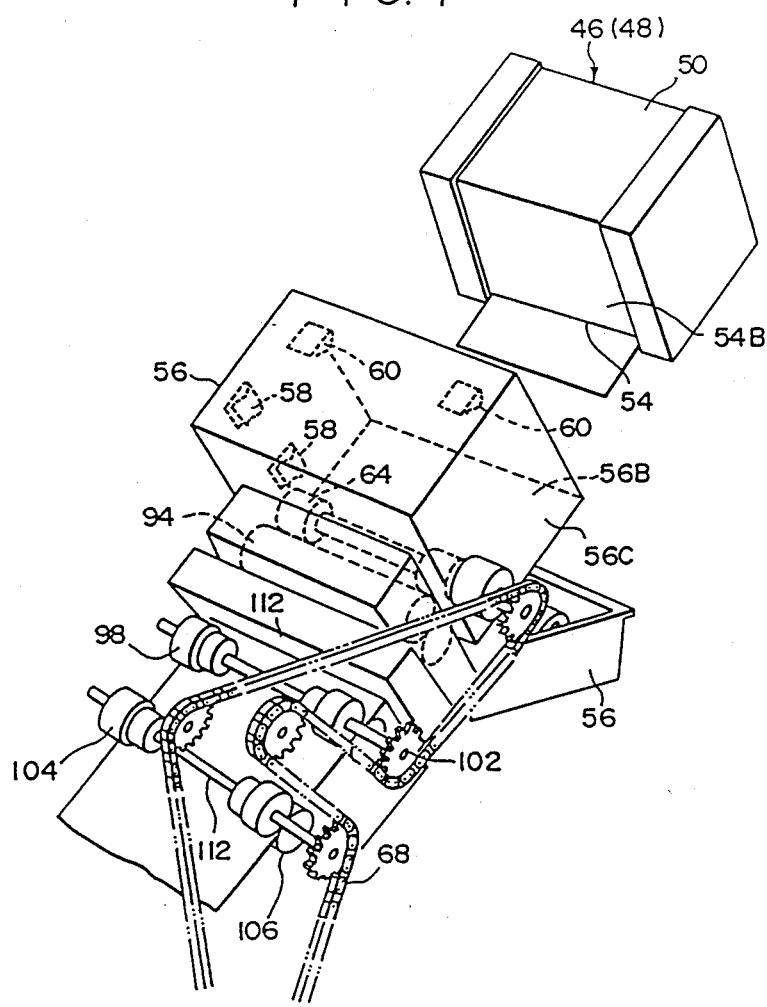
FIG. 4 is a perspective view of the photosensitive material receiving portion.

As shown in FIG. 2, two photosensitive material magazines 46, 48 are provided in the photosensitive material receiving portion 26 so that, when one of the magazines is emptied, the photosensitive material P is supplied from the other magazine. As shown in FIGS. 3 and 4, each of these two photosensitive magazines 46, 48 has a cylindrical case 50 in which a roll 52 of the photosensitive material P is rotatably supported on its axis and a supply opening or port 54 is so formed as to allow the photosensitive material P to be supplied from the periphery thereof.

Each of the photosensitive material magazines 46, 48 is so designed as to fit into a receiving box 56 when inserted through an opening 56A at the upper end thereof. Plate springs 58, 60 are provided on the receiving box 56 for the purpose of pressing each of the magazines 46, 48 against side walls 56B, 56C of the receiving box 56. The sides of each of the photosensitive material magazines 46, 48 are therefore pressed against the side walls 56B, 56C and positioned there, a bottom 54B in which the supply port 54 is formed also being pressed against a shield block 62 provided on a bottom wall 56D of the receiving box 56 so that the supply port 54 is shielded against the ingress of light from the exterior.

A drive roller 64 and a press roller 66 are provided on the receiving box 56 in correspondence with the supply port 54 of each of the photosensitive material magazines 46, 48. Each of the drive roller 64 and the press roller 66 has an intermediate portion with a smaller diameter which allows the photosensitive material P extracted from each of the photosensitive material magazines 46, 48 to be driven while being held at both widthwise ends thereof. All of the rollers provided in the region ahead of the heat development portion 36 also have an intermediate portion with a smaller diameter incorrespondence with the photosensitive surface of the photosensitive material which is provided to prevent rubber adhesion.

As shown in FIG. 3, part of a timing belt 68 is wound around the drive roller 64 and rotates when subjected to the driving force of a motor 70.

The receiving box 56 for receiving the press roller 66 can be selectively rotated by a support means (not shown) around a shaft 74 which serves as the center of rotation from the state shown by the solid lines in FIG. 3 to the state shown by the phantom lines.

An intermediate portion of an arm 76 is rotatably supported by means of a pin 78 on a rotary bracket 72 which is provided in the receiving box 56, and the axis of the press roller 66 is rotatably supported at one end of the arm 76. A tension spring 80 is interposed between the other end of the arm 76 and the rotary bracket 72 and produces an urging force to press the drive roller 64 against the press roller 66 in the state shown by the solid lines in FIG. 3. If the receiving box 56 assumes the state shown by the phantom lines in FIG. 3, the press roller 66 is separated from the drive roller 64 so that the photosensitive material P is no longer held therebetween, thereby allowing each of the photosensitive material magazines 46, 48 to be changed.

When the receiving box 56 assumes the state shown by the solid lines in FIG. 3, the supply port 54 of each of the photosensitive material magazines is shielded against light by the rotary bracket 72 and the receiving box 56 so that, even when one of the photosensitive material magazines 46, 48 is changed, the photosensitive material P received in the other magazine cannot be carelessly exposed to light.

Inclined guideways 82, 84 for guiding the photosensitive material P which has been pulled out from the supply port 54 by the drive roller 64 and the press roller 66 is provided on the receiving box 56. An intermediate portion of each of the inclined guideways 82, 84 is passed through a douser 86 which extends from the receiving box 56. The douser 86 serves to substantially divide the photograph-producing chamber 16 into two portions together with the receiving box 56, as well as enabling the treatment portion downstream of each of the inclined guideways 82, 84 to be shielded against the intrusion of light from the receiving box 56 so that no light can enter into the portion downstream of the photographic exposure portion 28 when either of the photosensitive material magazines 46, 48 is changed.

Two shield rollers 94, 96 are provided upstream of the douser 86 in each of the inclined guideways 82 84 so as to carry the photosensitive material P while holding it therebetween. In other words, the shield roller 94 is subjected to the driving force of the timing belt 68 through a gear (not shown), carrying the photosensitive material P while holding it, as well as preventing external light from entering the portion downstream thereof through either of the inclined guideways 82, 84.

A rotary cutter 88 is provided just behind the shield rollers 94, 96 in each of the inclined guideways 82, 82 which are shielded against the intrusion of light by the douser 86 so as to cut the photosensitive material P into required length, i.e., corresponding to the size of each photographic image. A fragment receiving box 90 is provided immediately below the cutter 88 for receiving fragments cut off the photosensitive material P. Since this fragment receiving box 90 is provided just below the cutter 88 and each of the guideways 82, 84 passing through the cutter 88 is inclined, no fragments remain in either of the guideways 82, 84, and thus the photosensitive material P can be conveyed without interference.

Carrier rollers 98, 100 are provided downstream of the cutter 88 for carrying the photosensitive material P forward after it has been cut. A gear 102 is fixed to the carrier roller 98 to receive the driving force of the timing belt 68, as shown in FIG. 4. A plurality of pairs of carrier rollers 104, 106 is provided downstream of the carrier rollers 98, 100. Guide plates (not shown) for guiding the photosensitive material P are also provided in each of the inclined guideways 82, 84 in correspondence with the widthwise edges of the photosensitive material P, as occasion demands.

Each of the carrier rollers 98, 100, 104, 106 has an intermediate portion 112 with a smaller diameter which is so formed as to be able to prevent from contacting with an intermediate portion of the photosensitive material P, as well as preventing dust from adhering to the emulsion surface formed on one side for the photosensitive material P and the portion on the back where the image is formed.

Figure 5:
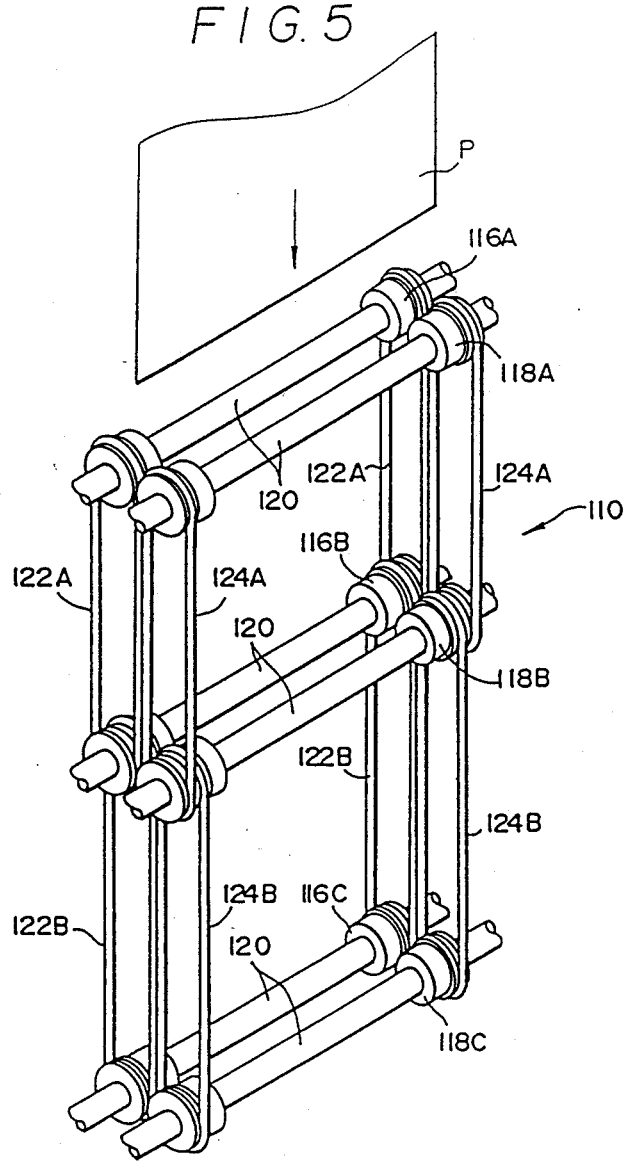
FIG. 5 is a perspective view of a vertical guideway.

A vertical guideway 110 shown in FIG. 5 is interposed between the lower end of the inclined guideway 82 and the photographic exposure portion 28. The vertical guideway 110 comprises three pairs of carrier rollers 116A, 116B, 116C and 118A, 118B, 118C around which round belts 122A, 122B and 124A, 124B are wound in such an arrangement that the photosensitive material P can be conveyed vertically in the downward direction.

In other words, the upper round belt 122A is wound around and between the uppermost carrier roller 116A and the intermediate carrier roller 116B in correspondence with the widthwise edges of the photosensitive material P, and the upper round belt 124A is wound around and between the uppermost carrier roller 118A and the intermediate carrier roller 118B in correspondence with the widthwise edges of the photosensitive material P. The straight portions of these upper round belts 122A and 124A adhere to each other on one side, thereby to convey the photosensitive material P while holding it therebetween. Similarly, the round belts 122B, 124B are respectively wound around and between the carrier rollers 116B, 118B and undermost carrier rollers 116C, 118C, and the straight portions of the round belts 122b, 124B adhere to each other on one side, also so conveying the photosensitive material P while holding it therebetween.

The driving force of the motor 70 is transmitted to the carrier rollers 116, 118 through a timing belt (not shown). Each of the carrier rollers 116, 118 also has an intermediate portion 120 with a smaller which serves to prevent the photosensitive material P from adhering to dust due to contact therewith.

(Description of Photographic Exposure Portion)

The photographic exposure portion 28 is described below with reference to FIGS. 6 to 8.

Figure 7:
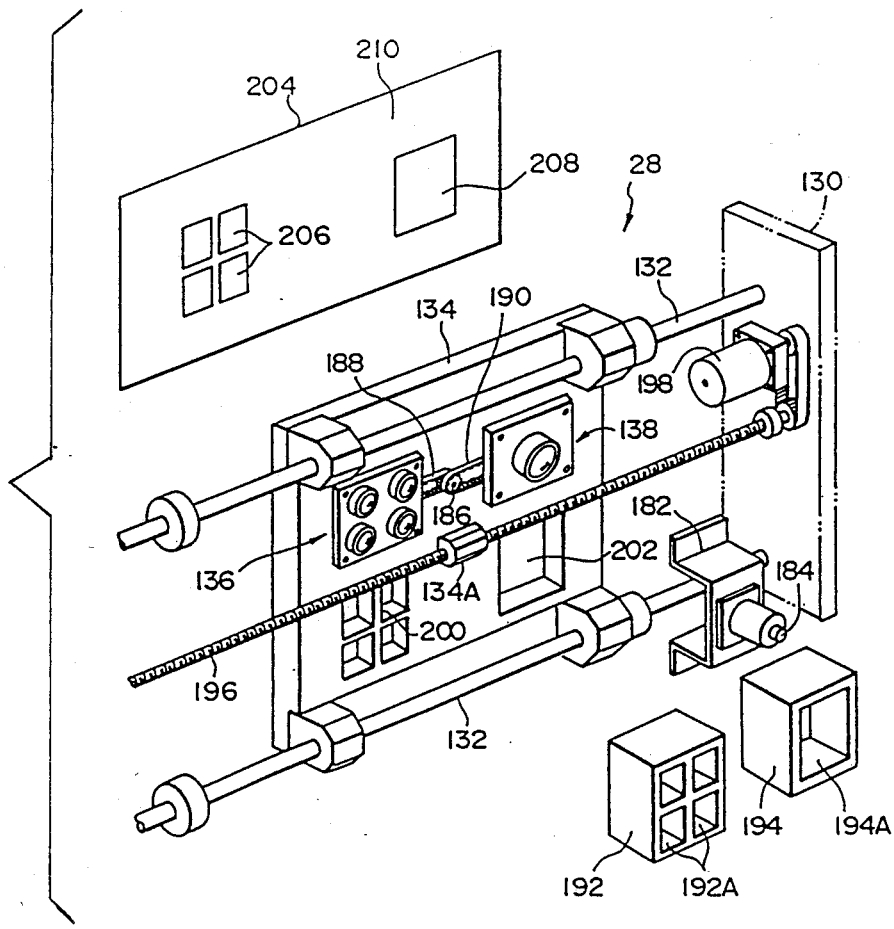
FIG. 7 is a perspective view of the photographic exposure portion and the frame exposure portion.

In the photographic exposure portion 28, two guide rods 132 are horizontally placed over two side plates 130 (only one of which is shown in FIG. 7) in such a manner as to support a movable base 134 which is thus able to horizontally move along the guide rods 132, as shown in FIG. 7. A four-image photographic shutter 136 and an one-image photographic shutter 138 are mounted side by side on the movable base 134.

Figure 8A:
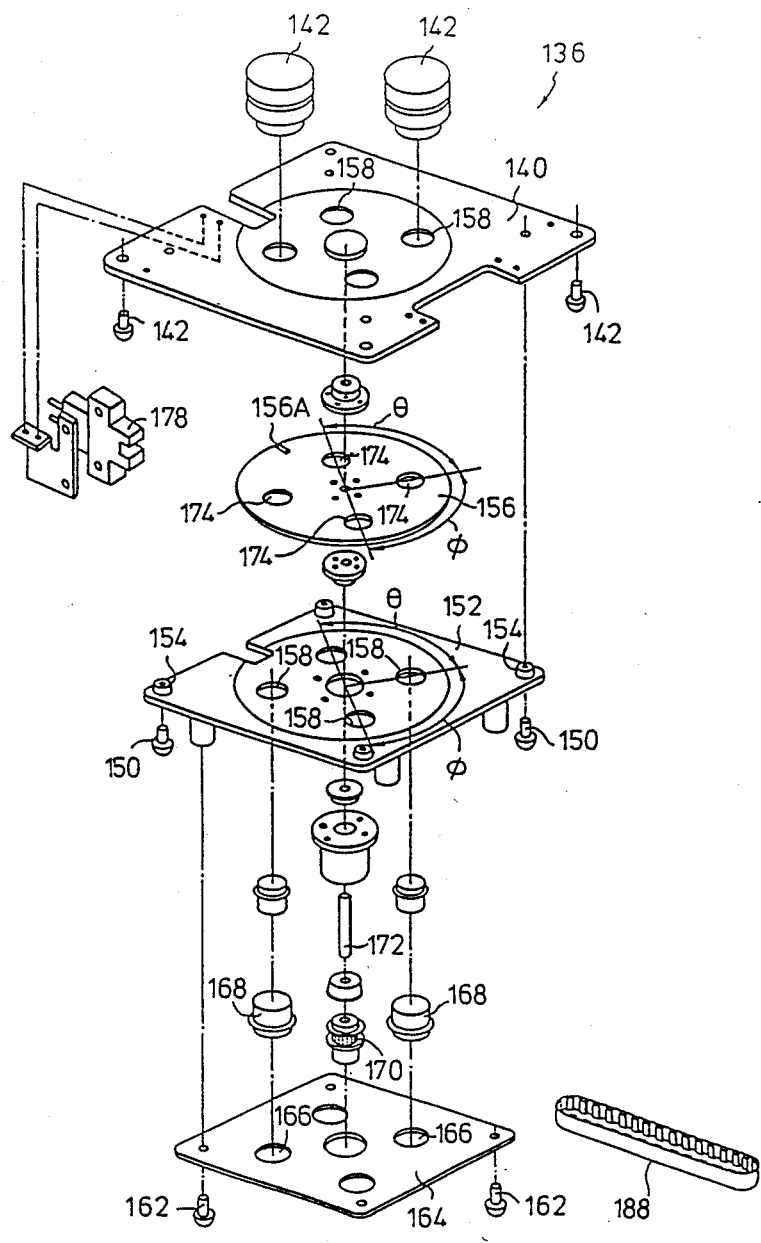
FIG. 8(A) is an exploded perspective view of a four-image photographic shutter and FIG. 8(B) is an exploded perspective view of a one-image photographic shutter.

As shown in FIG. 8(A), the four-image photographic shutter 136 comprises a front lens plate 140 which is fixed to the movable base 134 by means of machine screws 141 and on which four optical means 142 are provided so that four images F can be formed on the photosensitive material P by exposure, as shown in FIG. 9. Each of the images F so-formed is an image with a lengthwise dimension B that is greater than the widthwise dimension A, i.e., an oblong image.

Figure 10:
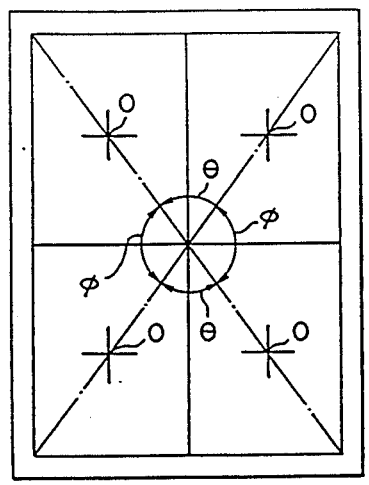
FIG. 10 is a front view of a photosensitive material which shows the arrangement of four optical axes around the center of rotation of the shutter in a case where four images are exposed.

The exposure optical axis O of each exposure of the images F is therefore disposed at different angles $\theta$ and $\phi$ around center of the four images with respect to the adjacent optical axes O, as shown in FIG. 10.

As shown in FIG. 9, each exposure of the four images F is performed on an area greater than the size of each of the images F to give a product having the dimensions A, B. The overlapping portions between the respective images F are exposed to a quantity of light which is greater than that for the images F themselves. The exposure of a cross-shaped exposed portion 144 shown in FIG. 9 which forms the boundaries between the respective four images F takes twice as much as time the exposure of margin portions 146 of the four images F, and is thus greater in magnitude than the latter.

As shown in FIG. 8, a rear lens plate 152 is fixed to the front lens plate 140 by means of machine screws 150. Spacers 154 are respectively provided in the mounting portions of the machine screws 150 to form a gap between the rear lens plate 152 and the front lens plate 140, a shutter body 156 being disposed in the gap. Four openings 158 are formed in the rear lens plate 152 in correspondence with the optical means 142.

A hood presser 164 is fixed to the rear lens plate 152 by means of machine screws 162. Four openings 166 are provided in the hood presser 164 in correspondence with the optical means 142, while optical means 168 are disposed in the openings 166 so as to form images in combination with the optical means 142.

A pulley 170 is axially supported by the hood presser 164 and a driving shaft 172 which is fixed to the pulley 170 is connected to the shutter body 156. Openings 174 are formed in the shutter body 156 in correspondence with the optical means 142. These four openings 174 are formed at different angles $\theta$ and $\phi$ around the center in correspondence with the exposure optical axes O shown in FIG. 10.

An optical sensor 178 is provided on the front lens plate 140 for controlling the rotational angle of the shutter body 156, this action being based on detection of a slit 156A formed in the shutter body 156.

Figure 8B:
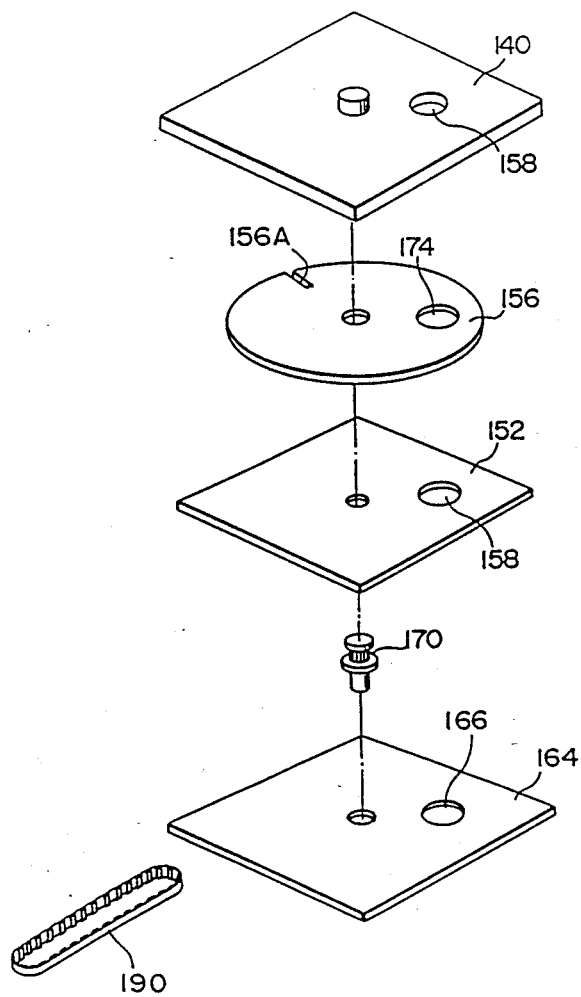

On the other hand, although the one-image photographing shutter 138 shown in FIG. 8(B) comprises members having the same configurations as those shown in FIG. 8(A), only one of openings 158, 174, 158 is respectively provided in the front lens plate 140, the shutter body 156 and the rear lens plate 152 so that a relatively large single image can be formed on the photosensitive material P. The single image is an oblong image obtained simply by enlarging one of the four images F obtained in the case of four-image exposure, as shown in FIG. 9(B).

As shown in FIG. 7, a motor 184 is provided on the movable base 134 in an intermediate portion between the four-image photographic shutter 136 and the one-image photographic shutter 138 through a bracket 182. A pulley 186 is fixed to an output shaft of the motor 184, and endless timing belts 188, 190 which are wound around the pulley 186 are respectively wound around the pulleys 170 of the four-image photographing shutter 136 and the one-image photographing shutter 138 so that the shutter bodies of the four-image photographing shutter 136 and the one-image photographing shutter 138 can be simultaneously rotated at required angles by the motor 184.

As shown in FIG. 7, light guide boxes 192, 194 are respectively provided corresponding to the four-image photographing shutter 136 and the one-image photographing shutter 138. The light guide box 192 is divided into four light guideways 192A in correspondence with the four images F of the four-image photographing shutter 136, and the light guide box 194 has a single light guideway 194A. As shown in FIG. 9, the light guide box 192 serves to guide light used for photographic exposure in such a manner that the four images F having the cross-shaped exposed portion 144 and the margin 146 can be exposed without overlapping exposure being produced between the four images F except for the cross-shaped exposed portion 144.

As shown in FIG. 7, a screw shaft 196 is placed over the side plates 130 in parallel with the guide rods 132 and passes through a bracket 134A of the movable base 134. The screw shaft 196 serves to drive the movable base 134 in the lateral direction by a motor 198 provided on one of the side plates 130 so as to selectively cause the four-image photographing shutter 136 or the one-image photographing shutter 138 to face the photosensitive material P.

As shown in FIG. 6, the photosensitive material P is vertically disposed in the photographic exposure portion 28, the upper and lower ends thereof respectively being held between upper holding carrier rollers 218A, 218B and lower holding carrier rollers 220A, 220B. Each of these rollers has an intermediate portion with a smaller diameter which can prevent rubber adhesion and is controlled to precisely stop the photosensitive material P at the photographic exposure position by being subjected to the driving force of the motor.

The upper holding carrier rollers 218A, 218B may be temporarily rotated in the direction of carriage and the reverse direction to apply tension to the photosensitive material P for the purpose of improving the flatness of the photosensitive material P.

A pressure means 222 which is pressed against the photosensitive material P during photographic exposure is disposed on the back of the photosensitive material P placed in the portion of photographic exposure. In the pressure means 222, a presser plate 224 is supported at its upper and lower ends by combination between pins 225 and elongated holes 224A so as to be able to contact with or separate from the photosensitive material P, as well as being pressed against the photosensitive material P by rotation of eccentric cams 226. A guide plate 228 in which an exposure portion is punched out is disposed on the exposure side of the photosensitive material P so as to support the pressure of the presser plate 224 and maintain the flatness of the photosensitive material P.

(Description of Frame Exposure Portion)

As shown in FIG. 7, in the movable base 134, frame exposure openings 200, 202 are respectively formed below the four-image photographic shutter 136 and the one-image photographic shutter 138. A lith or lithographic film 204 is fixed to the frame exposure openings 200, 202 so as to face the photosensitive material P. The lith film 204 has shield portions 206 which correspond to the exposure regions of the four images F except for the margin 146 shown in FIG. 9 and a shield portion 208 which corresponds to the region of the image printed by the one-image photographic shutter, as well as having a portion 210 which permits light to pass therethrough and which is provided around the shield Portions 206, 208. As shown in FIG. 6, a stroboscopic flashing means 212 is disposed in correspondence with either of the frame exposure openings 200, 202.

Figure 9A:
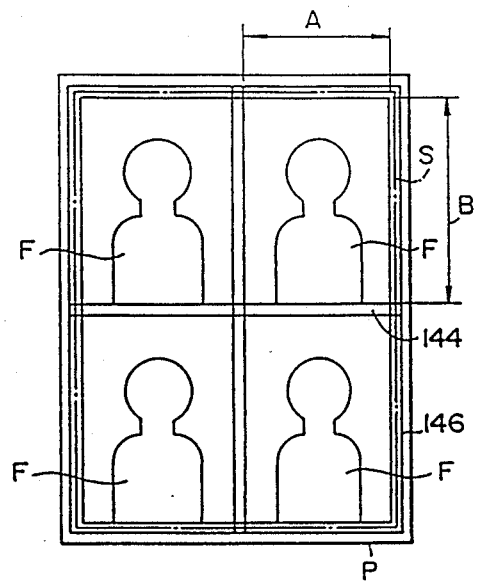
FIG. 9(A) is a front view of a photosensitive material in a state wherein four images are exposed and FIG. 9(B) is a front view of a photosensitive material in a state wherein one image is exposed.
Figure 9B:
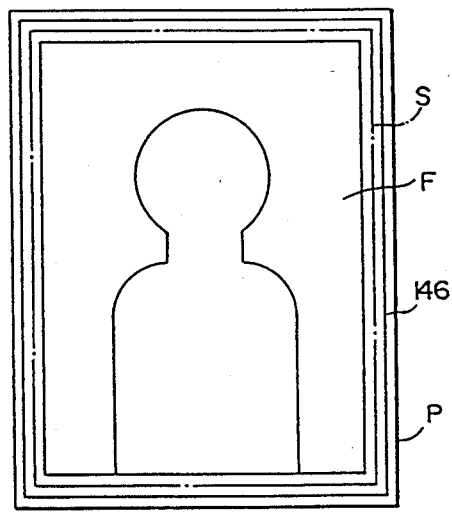

The frame exposure openings 200, 202 therefore enable the margin 146 which was exposed to a large quantity of light to be formed around the images F, as shown in FIGS. 9(A), 9(B). The size S of each of image F serving as a product (as occasion demands, the photosensitive material P is cut into this size S) is smaller than that of the margin 146.

If symbols or characters such as a date of Photographing are provided on the portion 210 which permits light to pass therethrough, such symbols and characters can be formed on each of the images F.

(Description of Water Application Potion)

Figure 11:
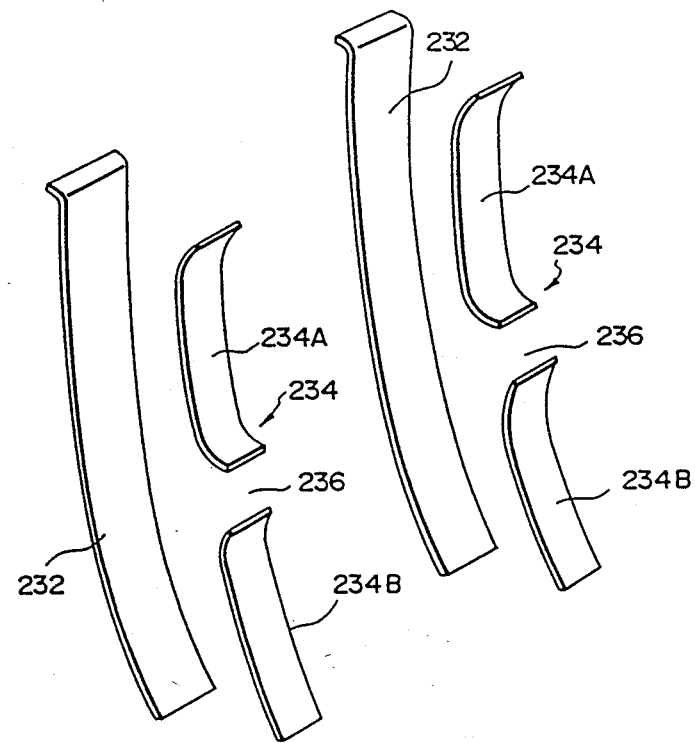
FIG. 11 is an exploded perspective view of the vertical guideway which is interposed between a frame exposure portion and a water application portion.

As shown in FIG. 2, a vertical guideway 230 which is the same as the vertical guideway 110 is provided below the frame exposure portion 30, and two pairs of guide plates 232, 234 are interposed between the vertical guideway 230 and the water application portion 32. As shown in FIG. 11, each of the guide plates 234 is divided into an upper guide plate 234A and a lower guide plate 234B with a gap 236 therebetween. These guide plates 232, 234 are capable of holding the widthwise edges of the image F therebetween in the same way as in the vertical guideway 110.

Each of the gaps 236 is provided for the purpose of absorbing the difference in the treatment speeds between the photographic exposure portion 28 and the frame exposure portion 30 and the water application portion 32. In other words, the treatment speeds in the photographic exposure portion 28 and the frame exposure portion 30 are relatively high, and the treatment speed in the water application portion 32 is low. When the photosensitive material P is carried by the vertical guideway 230 at the speed which is the same as that in the photographic exposure portion 28 and the frame exposure portion 30, if the material P is carried at a low speed in the water application portion 30, the gaps 236 enable a bent portion 238 to be spontaneously formed in an intermediate portion of the photosensitive material P, the front end thereof reaching the water application portion 32, as shown in FIG. 2, thereby absorbing the difference in the treatment speeds.

Figure 12:
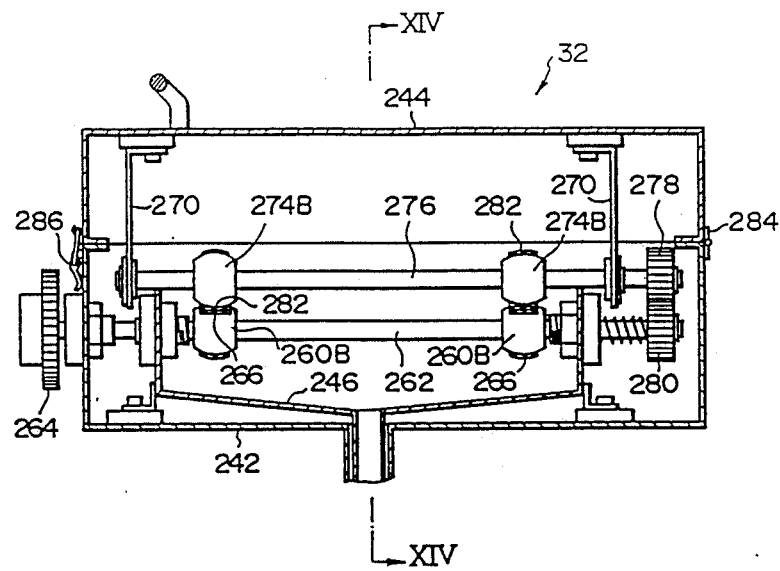
FIG. 12 is a sectional view of a water application portion.
Figure 13:
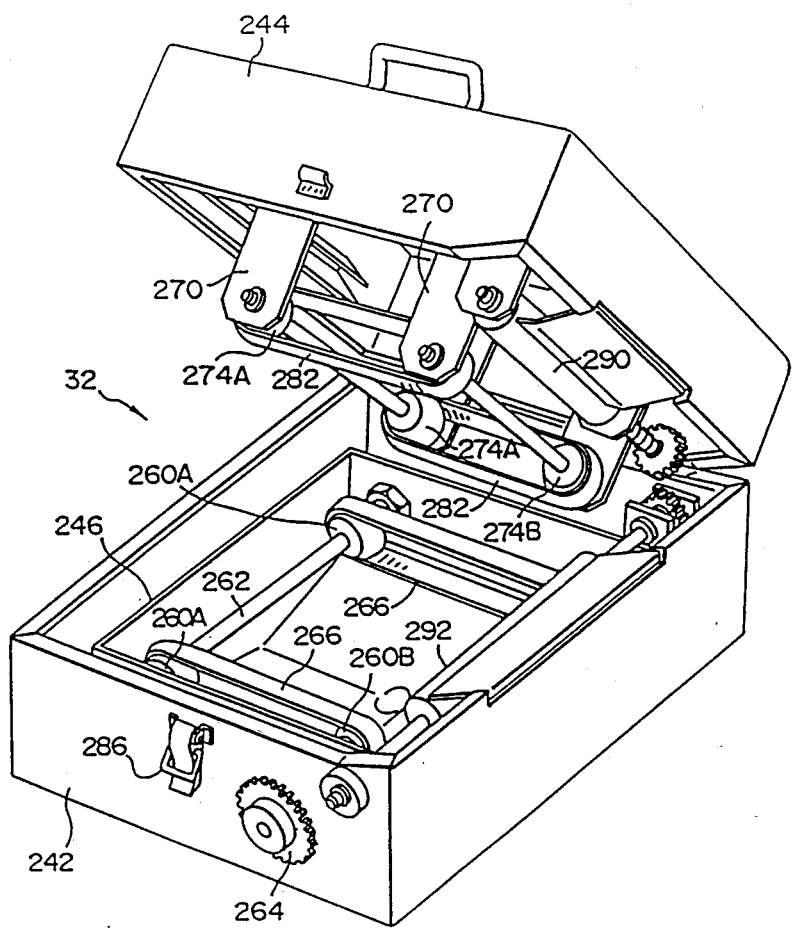
FIG. 13 is a perspective view of a water application portion.
Figure 14:
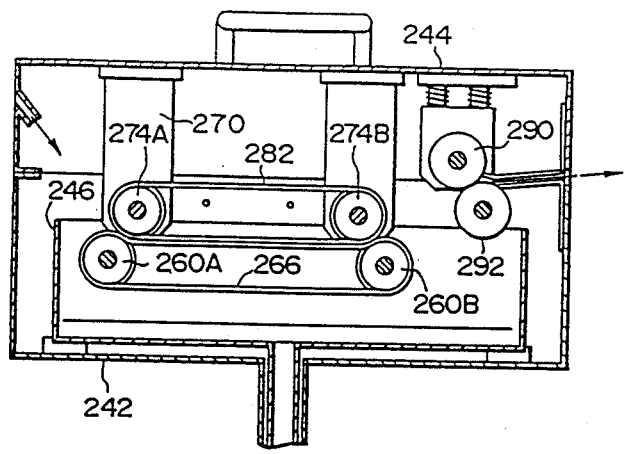
FIG. 14 is a sectional view taken in the direction of the arrows on line XIV—XIV of FIG. 12.

As shown in FIGS. 12, 13, the water application portion 32 comprises a lower case 242 and an upper case 244 which are engaged with each other to form a closed state wherein the degree of evaporation is reduced.

The lower case 242 contains a water tray 246 which stores water serving as a solvent for forming the images. The water 250 in a tank 248 is supplied to the water tray 246 by a pump 252 through piping 254, as shown in FIG. 1. The supplied water 250 is kept at a given temperature by a heater 256 disposed in the tank 248 for the purpose of increasing the efficiency of image formation and preventing the water 250 from freezing.

Two pairs of lower rollers 260A and 260B are respectively fixed to lower support shafts 262 at an inlet and outlet for the photosensitive material P of the water tray 246. Each of the lower support shafts 262 is axially supported by the lower case 242, one of the lower support shafts 262 being rotated by a gear which is fixed to the outside of the lower case 242 and which is subjected to the driving force of a motor (not shown). A endless guide belt 266 is wound around and between each pair of lower rollers 260A, 260B at the inlet and outlet for the photosensitive material P in correspondence with the widthwise edges of the material P.

Upper support shafts 276 are axially supported by brackets 270 fixed to the upper case 244, and two pairs of upper rollers 274A, 274B are respectively fixed to the upper support shafts 276 in correspondence with the lower rollers 260A, 260B. The end of one of the upper support shafts 276 is connected to a gear 278 which engages with the gear 280 fixed at the end of one of the lower support shafts 262 so as to be rotated by being subjected to the turning force of the lower shaft 262. An endless guide belts 282 are respectively wound around and between the pairs of upper rollers 274A, 274B so that the straight portions thereof respectively adhere to the straight portions of the endless guide belts 266, whereby the images F can be carried while the widthwise edges thereof being held therebetween.

In this case, since the distance between each pair of upper rollers 274A, 274B is smaller than that between each pair of lower rollers 260A, 260B, the upper rollers 271A, 274B cause the endless guide belts 266 to be downwardly bent, thereby improving adhesion between the endless guide belts 282 and the endless guide belts 266.

As shown in FIG. 12, the upper case 244 is rotatably supported to the lower case 242 through hinges 284, and a closed state is kept by a lock means 286. The water at a given temperature in the water tray 246 is therefore prevented from unnecessarily evaporating therefrom. When the lock means is released, however, the upper case 244 is raised from the lower case 242 while rotating so that the water application portion 32 is opened and thus can be easily repaired.

After water application, the photosensitive material P is sent to the heat development portion 36 while being held between the endless guide belts 266 and the endless guide belts 282 and between holding carrier rollers 290, 292 provided at the outlet for the photosensitive material P.

(Description of Image Receiving Material-Receiving Portion)

Figure 16:
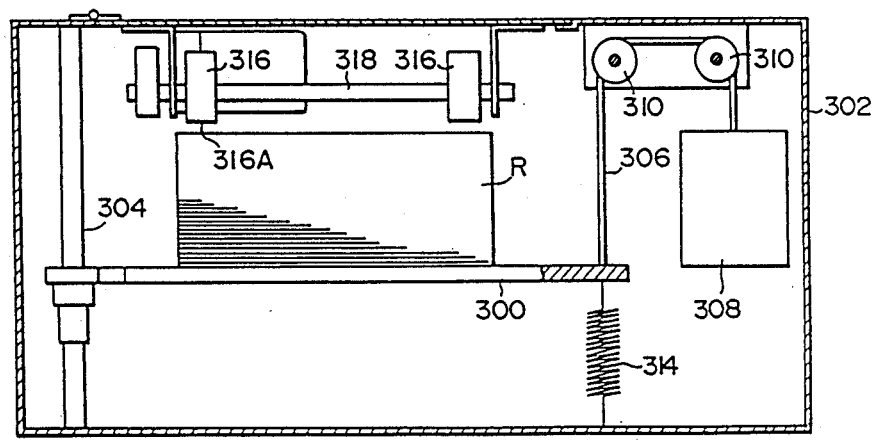
FIG. 16 is a sectional view taken in the direction of the arrows on line XVI—XVI of FIG. 15.
Figure 15:
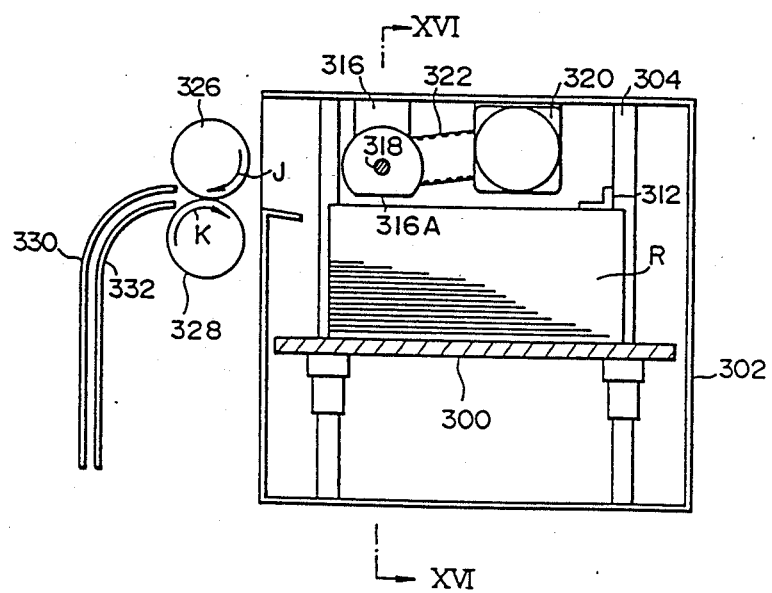
FIG. 15 is a vertical sectional view of an image receiving material receiving portion.
Figure 17:
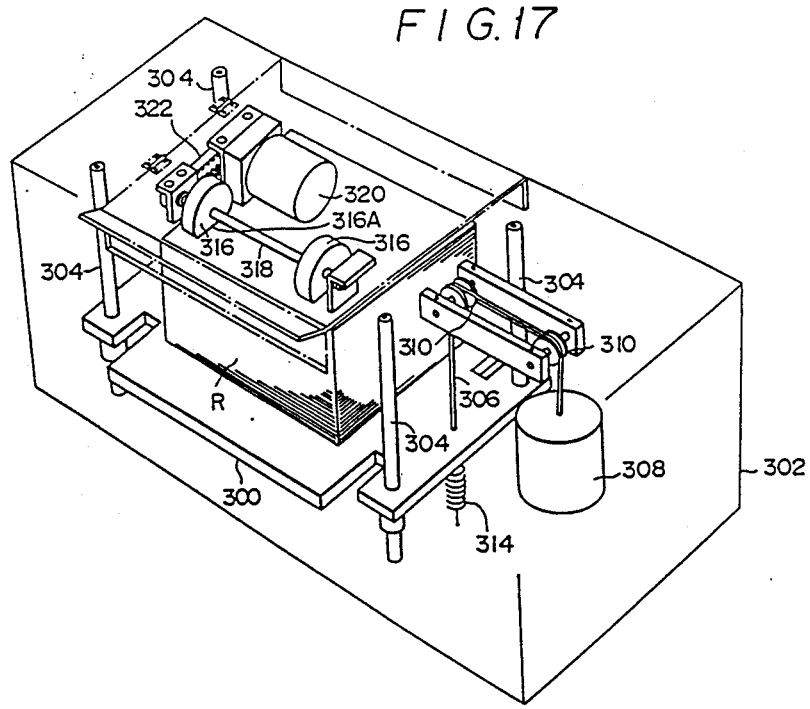
FIG. 17 is a through-vision perspective view of an image receiving material receiving portion.

As shown in FIGS. 15 to 17, a plurality of image receiving materials P is received in layers on an elevating base 300.

The elevating base 300 can be longitudinally moved along a plurality of guide rods 304 which is stood in parallel in an image receiving material box 302. One end of a cable 306 is fixed to the elevating base 300, a weight 308 being fixed to the other end thereof. An intermediate portion of the cable 306 is wound around guide pulleys 310 so that the direction of the cable 306 is changed. When a downward urging force is produced by the weight 308 owing to its weight, therefore, the elevating base 300 is subjected to an upward urging force and can be thus raised.

The elevating base 300 thus always presses the image receiving material R at the top layer against a stopper 312 owing to the urging force of the weight 308. If the number of the image receiving materials R is reduced, however, the force to press the image receiving material R at the top layer against the stopper 312 is increased. In other words, if the number of the image receiving materials R is reduced, the effect of absorbing the force exerting in the direction of the thickness of the image receiving materials R is reduced and thus the pressure applied to the image receiving materials R is increased. In order to control this, a tension coil spring 314 is interposed between the elevating base 300 and the image receiving material box 302 so as to downwardly urge the weight 308 against the urging force of the weight 308 by an urging force which is smaller than that of the weight 308.

Semicircular rollers 316 are brought into contact with the top image receiving material R. A timing belt 322 for receiving the driving force of a motor 320 is wound around a rotational shaft 318 fixed at the axes of the semicircular rollers 316. Notch portions 316A of the semicircular rollers 316 are brought into contact with the top image receiving material R in the normal state. If the motor is rotated, however, the periphery of each of the semicircular rollers pushes out the top image receiving material R along the surface thereof and send it to the portion between carrier rollers 326, 328.

These carrier rollers 326, 328 are rotated in opposite directions. In other words, the carrier roller 326 is rotated in the direction shown by an arrow J to carry the top image receiving material R to the portion between guide plates 330, 332, while the carrier roller 328 is rotated in the reverse direction shown by an arrow K to return the top image receiving material R to the image receiving material box 302. If two image receiving materials R are carelessly sent by the semicircular rollers 316, therefore, only the upper image receiving material R is sent to the portion between the guide plates 330, 332, and the lower image receiving material R is returned to the image receiving material box 302.

The image receiving material R sent from the guide plates 330, 332 is sent to the heat development portion 36.

(Description of Heat Development Portion)

Figure 18:
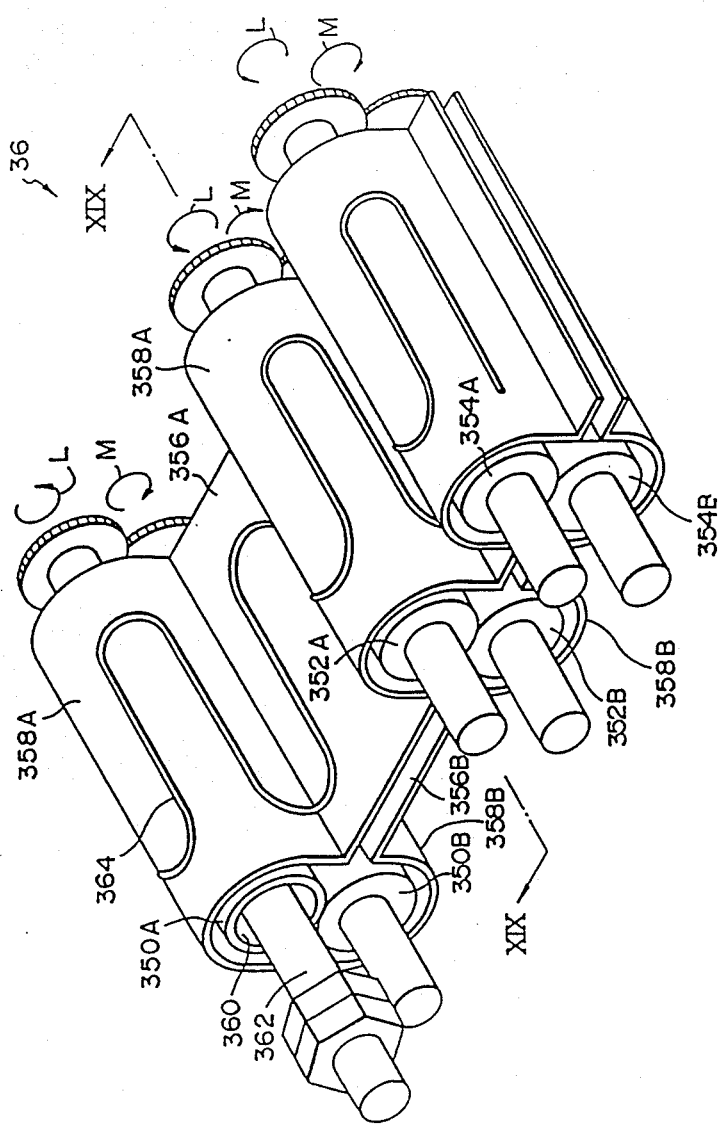
FIG. 18 is a perspective view of a heat development portion.
Figure 19:
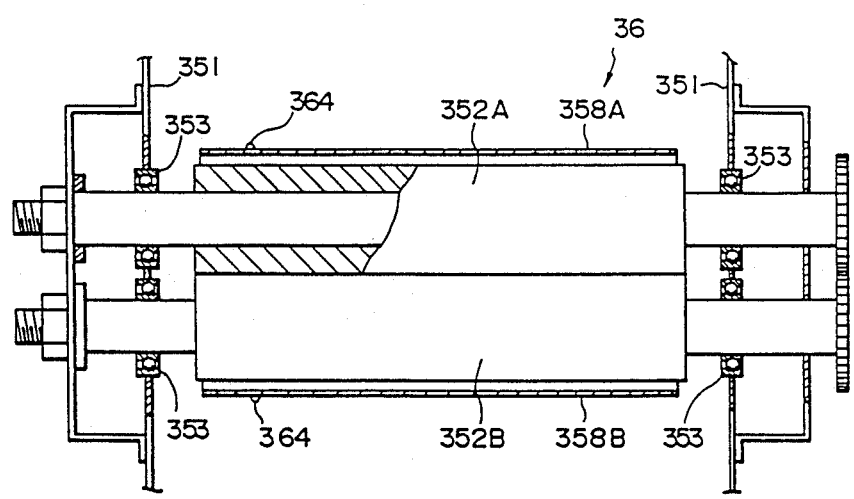
FIG. 19 is a sectional view taken in the direction of the arrows on line XIX—XIX of FIG. 18.

As shown in Figs. 18, 19, the heat development portion 36 comprises two carrier rollers 350A, 350B at an inlet, two carrier rollers 352A, 352B at an intermediate position and two carrier rollers 354A, 354B at an outlet, which are all axially supported by side plates 351 through bearings 353 to form a horizontal carriage path.

The driving force is transmitted to these rollers from a drive source so as to rotate them in the directions shown by arrows L and M. The photosensitive material P and the image receiving material R which are respectively sent from the water application portion 32 and the image receiving material-receiving portion 34 are adhered to each other so that the emulsion surface of the photosensitive material P adheres to the image receiving surface of the image receiving material R, and are then to the heat development portion 36.

Figure 22:
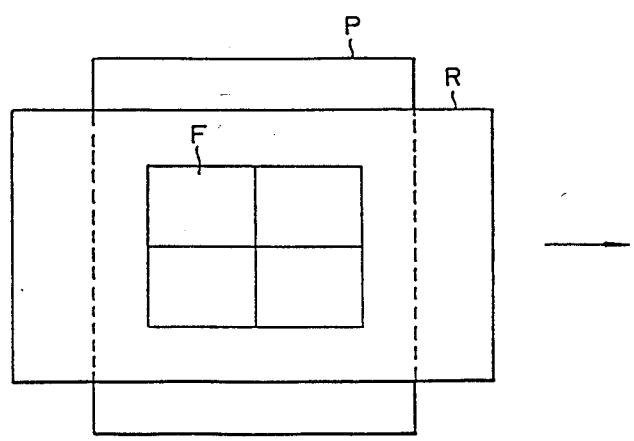
FIG. 22 is a plan view showing the state wherein a photosensitive material is adhered to an image receiving material.

The size and the carriage timing of each of the materials P and R are determined so that the materials reach the heat development portion 36 in the state wherein the photosensitive material P projects from the image receiving material R in the widthwise direction and the image receiving material R projects from the photosensitive material P in the direction of carriage, as shown in FIG. 22.

Guide plates 356A, 356B are disposed one above the other between the respective carrier rollers so as to guide the photosensitive material P and the image receiving material R which are adhered to each other. The guide plates 356A, 356B are respectively formed as units with circular arcs 358A, 358B which respectively cover the portions of the peripheries of the carrier rollers which are opposite to the carriage path.

The carrier roller 350A has a hollow portion 360 in which a heater 362 is received. The carrier roller 350A is thus heated from its interior by the heater 362 so that the photosensitive material P and the image receiving material R can be heated. A heater 364 is adhered to the portion of each of the guide plates 356A, 356B which is opposite to the carriage path and extends along the carriage path and the periphery of each carrier roller so as to be able to generate heat. Each of the guide plates 356A, 356B therefore generates heat by the aid of the heater 364 so as to be able to heat the photosensitive material P and the image receiving material R which are plated in the guideway.

The heaters 362, 364 are consequently able to heat the photosensitive material P and the image receiving material R which are adhered to each other so that the photosensitive material P can be first heat-developed and the developed image can be then transferred to the receiving material R.

(Description of Separation Portion)

Figure 20:
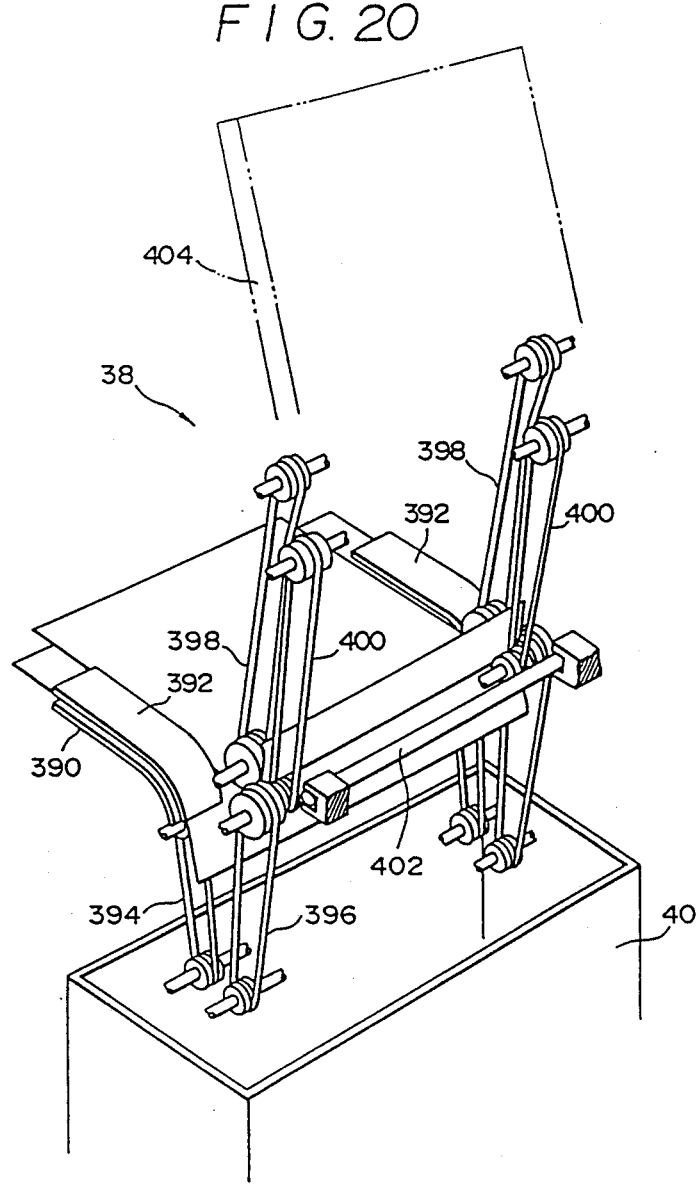
FIG. 20 is a perspective view of a separation portion.

As shown in FIGS. 20 and 21, the separation portion 38 comprises lower guide plates 390 and upper guide plates 392 which are disposed corresponding to both edges of the photosensitive material P sent. Since the photosensitive material P is previously so formed as to have a width which is greater than that of the image receiving material R as shown in FIG. 22, the both ends of the photosensitive material P which project from the image receiving material R are guided by the lower guide plates 390 and the upper guide plates 392 while being held therebetween and sent to a photosensitive material disposal box 40.

Endless belts 394, 396 are respectively disposed on both sides of the guideway of the photosensitive material P for the purpose of sending the photosensitive material P to the photosensitive material disposal box 40 so as to send the photosensitive material P to the disposal box 40 in contact with the surfaces thereof.

The separation portion 38 also comprises endless belts 398, 400 for the purpose of holding the edges of the image receiving material R therebetween. These endless belts 398, 400 are disposed corresponding to the widthwise edges of the image receiving material R so as to able to first hold the front end of the image receiving material R therebetween which was sent from the heat development portion 36 in the horizontal direction and then to upwardly bent and raise it. Since the image receiving material R is previously adhered to the photosensitive material P in the state shown in FIG. 22 wherein the front end of the former projects from the front end of the latter, the projecting portion of the image receiving material R is held between the endless belts 398 and 400 and raised by the belts. In this state, the front end of the photosensitive material P is downwardly guided by the lower guide plates 390 and the upper guide plates 392 so that the image receiving material R raised is separated from the photosensitive material P which is downwardly guided by the lower guide plates 390 and the upper guide plates 392 After the image receiving material R has been separated, it is dried by a heater 402 which is provided corresponding to the image receiving surface of the image receiving material R.

An oblong guide portion 404 is provided above the endless belts 398, 400 so that the image receiving material R which is raised while its widthwise edges being held between the endless belts 398, 400 is first sent to the guide portion 404 and then falls down to the takeoff box 39 owing to its weight when the rear end thereof is sent from the endless belts 398, 400.

As shown in FIG. 2, a stroboscope 18 which is used for lighting the person 22 to be photographed is provided on a partition 12A which serves to divide the housing 12 into the photographic chamber 14 and the photograph producing chamber 16.

(Function of Embodiment)

In the photosensitive material receiving potion 26, the photosensitive material P is sent from one of the photosensitive material magazines 46, 48 which is previously determined, cut into a given length by the cutter 88, sent to the photographic exposure portion 28 and stopped therein. In this case, since the photosensitive material P which was extracted from the photosensitive material receiving portion 26 and then cut is carried by the carrier rollers 98 and 104 and the vertical guideways 110 and 230 which are shown in FIG. 5 while its widthwise edges being held therebetween, no particles of dust adhere to the image portion of the photosensitive surface.

If the photosensitive material P which was cut at its end by the cutter 88 is backwardly sent toward one of the magazines by reverse rotation of the driving rollers 64, 66 and the shield rollers 94, 96 and maintained at the state wherein the front end thereof is held between the driving rollers 64, 66, any pressure fogging can be prevented from being produced by the shield rollers 94, 96 even if the photosensitive material P is not used for a long time.

The person 22 to be photographed enters the photographic chamber 14 and takes the seat 20. The person 22 is lighted by a lighting apparatus when a button is pushed or a coin is thrown At the same time, the motor 198 in the photographic exposure portion 28 is started so that the four-image photographic shutter 136 or the oneimage photographic shutter 138 is moved corresponding to the exposure axes O in accordance with the selection by the person 22.

When the shutter body 156 is then rotated by rotation of the motor 184 and the openings 158 are fitted to the exposure optical axes O, the images F are exposed on the photosensitive material P. In this case, if the four-image photographic shutter 136 is selected, the four images F are exposed, and, if the one-image photographic shutter 138 is selected, one enlarged image F is exposed In particular, since the four-image photographic shutter 136 has the openings 174 which are formed around the rotational axis in a non-uniform manner, i.e., they are formed at angles $\theta$ and $\phi$, as shown in FIG. 8(A), all the four images F are exposed as oblong images in the same exposure time.

The shutter body 156 may be selectively rotated in only one direction or either of both the directions in a reciprocating manner so as to be always returned to a given position.

The photosensitive material P is then sent to the frame exposure portion 30. In the frame exposure portion 30, the lith film 204 is adhered to the photosensitive material P so that the central portions of the images F are covered with the shield portions 206, as well as the margin 146 being exposed around the images F through the portion 210 which permits light to pass therethrough by light emitted from the stroboscopic flashing means. If the either of cross-shaped exposed portion 144 and the margin 146 has a large width, the photographs obtained can be cut into a desired size with satisfactory white frames formed around the images F.

When the one-image photographic shutter 138 is selected, the large image F is exposed in the central portion of the one-image photographic shutter 138, and the frame is exposed around the image F through the frame exposure opening 202 in the frame exposure portion 30 as the same way used in the four-image photographic shutter 136.

The photosensitive material P which was sent from the frame exposure portion 30 then reaches the water application portion 32. When the front end of the material P is held between the endless guide belts 266 and 288 of the water application portion 32, however, the bent portion 238 is formed in the gaps 236 owing to the difference in the carriage speeds between the front end and the rear end of the material P which is carried at a relatively low high speed from the frame exposure portion 30. The difference is caused by a relatively low speed of carriage in the water application portion 32. Since the difference in the speeds is absorbed by the bent portion, the photosensitive material P can be continuously carried.

In the water application portion 32, the water 250 is applied to the photosensitive material P which is passed through the water tray 246 during movement of the photosensitive material P at a low speed. Since the widthwise edges of the photosensitive material P are held between the endless belts 266, 282 in the water application portion 32, no undesired dust adhere to the image surface of the photosensitive material P. Since the water application portion 32 comprises the lower case 242 and the upper case 244 which are in a closed state, only a small amount of water evaporates from the water tray 246 kept at a given temperature.

In the image-receiving material receiving portion 34, the image-receiving material R is pressed against the stopper 312 by the elevating base 300 which is upwardly pushed by the weight 308, and the top image-receiving material R is extracted by rotation of the semicircular rollers 316 and then sent to the heat development portion 36. The pressure exerted by the weight 308 on the image-receiving materials R placed on the elevating base 300 is not excessively increased even if the number of material R is decreased because of the balance between the weight 308 and the tension coil spring 314.

The photosensitive material P is adhered to one imagereceiving material R which was sent from the image-receiving material receiving portion 34 in the state shown in FIG. 22 and is then sent to the heat development portion 36. In the heat development portion 36, heat development is rapidly performed because the photosensitive material P is heated to a given temperature by the heaters 362, 364. The developed image is then transferred to the image-receiving material R. Since no particle of dust adheres to the photosensitive surface of the photosensitive material P, the image can be precisely transferred to the image-receiving material R without being poorly transferred. In addition, since water is previously applied to the photosensitive material P, the efficiency of the image formation is increased.

After transfer has been performed, the photosensitive material P and the image-receiving material R in the state wherein they are adhered to each other are sent to the separation portion 38 as they were. In the separation portion. 38, the widthwise edges of the photosensitive material P are guided by the lower guide plates 390 and the upper guide plates 392 while being held therebetween so as to be downwardly bent. On the other hand, the front end of the image-receiving material R is held between the endless belts 398 and 400 and upwardly bent so that the image-receiving material R is separated from the photosensitive material P. The photosensitive material P is then received in the photosensitive material disposal box 40, and the image-receiving material R is sent to the guide portion 404 by the endless belts 398, 400 and then discharged as a product to the takeoff box 39. Since the image-receiving material R is previously dried by being heated by the heater 402, the person 22 can immediately take it off.

For example, when all the photosensitive material P is extracted from the photosensitive material magazine 46, the magazine 46 is removed from the receiving box 56 by rotating the receiving box 56 to the state shown by the phantom lines in FIG. 3. Since the receiving box 56 assumes the state shown by the solid lines in FIG. 3, the photosensitive material P which is supplied from the photosensitive material magazine 48 and reaches the position near the cutter 88 is not carelessly exposed to light during change of the photosensitive material magazine 46. This is applied to the change of the photosensitive material magazine 48.

(Effect of the Invention)

The present invention configured as described above therefore has an excellent effect of rapidly obtaining photographs.

What is claimed is:

1. A photograph-producing apparatus for rapidly obtaining an image of a person photographed comprising:
   (a) a portion for receiving a heat development photosensitive material;
   (b) a photographic exposure portion for performing photographic exposure of the image of said person on said photosensitive material sent from said receiving portion;

(c) a frame exposure portion for exposing the margin around said photographic image on said photosensitive material;

(d) an application portion for applying a solvent used for forming said image to said photosensitive material after frame exposure;

(e) a portion for receiving an image-receiving material;

(f) a heat development and transfer portion for causing said image-receiving material sent from said image-receiving material receiving portion to adhere to said photosensitive material to which said solvent for forming said image is applied and subjecting said photosensitive material to heat development, as well as transferring the developed image to said image-receiving material; and (g) a separation means for separating said photosensitive material from said image-receiving material which serves as a final product.

2. A photograph-producing apparatus according to claim 1 further comprising a housing which is divided into one side serving as a photographic chamber and the other side serving as a photograph-producing chamber, said photosensitive material and said image-receiving material respectively extracted from said heat development photosensitive material-receiving portion and said image-receiving material-receiving portion are disposed in a shield state in said photograph-producing chamber until they reach said separation means.

3. A photograph-producing apparatus according to claim 1, wherein a plurality of said portions for receiving said photosensitive material are provided so that said photosensitive material can be selectively supplied to said photographic exposure portion from one of said receiving portions.

4. A photograph-producing apparatus according to claim 2, wherein said heat development photosensitive material extracted from said photosensitive material-receiving portion passes through a shield member for partitioning off said photographic chamber from said photograph-producing chamber and enters said photograph-producing chamber.

5. A photograph-producing apparatus according to claim 2, wherein a magazine for receiving said photosensitive material has an interior in a shield state and is set to said photograph-producing chamber in a state wherein a photosensitive material supply port assumes a shield state.

6. A photograph-producing apparatus according to claim 1, wherein a multi-image photographic shutter used for simultaneously exposing a plurality of the same images on said photosensitive material and a single-image photographic shutter are selectively caused to face said photosensitive material in said photographic exposure portion.

7. A photograph-producing apparatus according to claim 6, wherein said photographic exposure portion is provided with said multi-image photographic shutter used for simultaneously exposing a plurality of the same images on said photosensitive material and a shutter body in which shutter openings are formed around the center of the rotation in correspondence with said plurality of said images.

8. A photograph-producing apparatus according to claim 7, wherein said plurality of said openings are formed around said center of rotation at different distances from the adjacent openings.

9. A photograph-producing apparatus according to claim 7, wherein portions between said plurality of said images are exposed in an overlapping state so as to be exposed to a large quantity of light.

10. A photograph-producing apparatus according to claim 6, wherein said multi-image photographic shutter and said single image photographic shutter are both provided on a movable base and are alternatingly caused to face said photosensitive material by reciprocating motion of said movable base.

11. A photograph-producing apparatus according to claim 1, wherein said frame exposure portion has means for covering the image exposure portion of said photosensitive material and frame exposure portion for sufficiently exposing the portion around said image exposure portion.

12. A photograph-producing apparatus according to claim 11, wherein said means for covering said image exposure portion has a shield portion provided on a transparent material corresponding to said image.

13. A photograph-producing apparatus according to claim 12, wherein said shield portion is so provided that the frame exposure is performed in such a manner as to produce a frame size which is greater than that of an image serving as a product.

14. A photograph-producing apparatus according to claim 1, wherein said photographic exposure portion comprises a multi-image photographic shutter for simultaneously exposing a plurality of the same image on said photosensitive material and a single-image photographic shutter, and said frame exposure portion comprises a first means for simultaneously exposing the margin around said plurality of images formed by said multi-image photographic shutter and a second means for exposing margin around said image formed by said single-image photographic shutter in correspondence with said multi-image and single-image photographic shutters.

15. A photograph-producing apparatus according to claim 14, further comprising means for automatically selecting said first means and said second means when said multi-image photographic shutter and said single-image photographic shutter are respectively caused to face said photosensitive material.

16. A photograph-producing apparatus according to claim 15, wherein a movable base on which said multi-image photographic shutter and said single-image photographic shutter are both mounted is provided as said means for automatically selecting, said first means and said second means being also provided on said movable base in correspondence with said multi-image and single-image photographic shutters.

17. A photograph-producing apparatus for rapidly obtaining the image of a person photographed comprising:

(a) a housing having a photographic chamber and a photograph-producing chamber, said person entering said photographic chamber and a photograph having said image is formed being produced in said photograph-producing chamber;

(b) a portion for receiving a heat development photosensitive material;

(c) a photographic exposure portion for performing photographic exposure of said image of said person on said photosensitive material sent from said receiving portion;

(d) a frame exposure portion for exposing the margin around said image on said photosensitive material;

(e) an application portion for applying a solvent used for forming said image to said photosensitive material after frame exposure;

(f) a portion for receiving an image-receiving material;

(g) a heat development and transfer portion for causing said image-receiving material sent from said image-receiving material receiving portion to adhere to said photosensitive material to which said solvent for forming said image is applied and subjecting said photosensitive material to heat development, as well as transferring the developed image to said image-receiving material; and (h) a separation means for separating said photosensitive material from said image-receiving material which serves as a final product.

18. A photograph-producing apparatus according to claim 17, wherein said photographic exposure portion has a multi-image photographic shutter for simultaneously exposing a plurality of the same image on said photosensitive material and a single-image photographic shutter, and said frame exposure portion has a first means for simultaneously exposing said margin around said plurality of images formed by said multiimage photographic shutter and a second means for exposing said margin around said image formed by said single-image photographic shutter.

19. A photograph-producing apparatus according to claim 18 further comprising means for automatically selecting said first means and said second means when said multi-image photographic shutter and said single-image photographic shutter are respectively caused to face said photosensitive material.

20. A photograph-producing apparatus for rapidly providing the image of a person photographed comprising:

(a) a portion for receiving a heat development photosensitive material;

(b) a photographic exposure portion for performing photographic exposure of person on photosensitive material sent from said receiving portion;

(c) a frame exposure portion for exposing the margin around said image on said photosensitive material, said frame exposure portion comprising a shield member for covering the image exposure portion of said photosensitive material and a light source for supplying sufficient exposure to said margin around said image exposure portion;

(d) an application portion for applying a solvent used for forming said image on said photosensitive material after frame exposure;

(e) a portion for receiving an image-receiving material;

(f) a heat development and transfer portion for causing said image-receiving material sent from said image-receiving material receiving portion to adhere to said photosensitive material to which said solvent for forming said image is applied and subjecting said photosensitive material to heat development, as well as transferring the developed image to said image-receiving material; and (g) a separation means for separating said photosensitive material from said image-receiving material which serves as a final product.

* * * * *